United States Patent
Gonzalez Sanchez (10) Patent No.: US 11,843,675 B2
(45) Date of Patent: Dec. 12, 2023

(54) METHOD AND SYSTEM FOR SYNCHRONIZING USER IDENTITIES

(71) Applicant: NEC Laboratories Europe GmbH, Heidelberg (DE)

(72) Inventor: Roberto Gonzalez Sanchez, Getafe Madrid (ES)

(73) Assignee: NEC CORPORATION, Tokyo (JP)

(*) Notice: Subject to any disclaimer, the term of this patent is extended or adjusted under 35 U.S.C. 154(b) by 239 days.

(21) Appl. No.: 16/156,007

(22) Filed: Oct. 10, 2018

(65) Prior Publication Data

US 2020/0120172 A1   Apr. 16, 2020

(51) Int. Cl.
| | |
|---|---|
| *H04L 67/50* | (2022.01) |
| *H04L 9/40* | (2022.01) |
| *H04L 67/02* | (2022.01) |
| *H04L 67/306* | (2022.01) |

(52) U.S. Cl.
CPC .......... *H04L 67/535* (2022.05); *H04L 63/168* (2013.01); *H04L 67/02* (2013.01); *H04L 67/306* (2013.01)

(58) Field of Classification Search
CPC ....... H04L 67/22; H04L 63/168; H04L 67/02; H04L 67/306
See application file for complete search history.

(56) References Cited

U.S. PATENT DOCUMENTS

| | | | | |
|---|---|---|---|---|
| 6,996,718 B1* | 2/2006 | Henry | ...................... | G06F 21/41 713/184 |
| 7,747,850 B1* | 6/2010 | Gordon | ................. | H04L 63/104 713/155 |
| 7,984,097 B2* | 7/2011 | Fernandez | ............. | G06Q 30/02 709/224 |
| 8,327,128 B1* | 12/2012 | Prince | ................. | H04L 63/0884 713/153 |
| 8,381,279 B2* | 2/2013 | Michener | ................ | G06F 21/31 726/7 |

(Continued)

FOREIGN PATENT DOCUMENTS

| | | | |
|---|---|---|---|
| CN | 108234642 A | * | 6/2018 |
| KR | 20180040060 A | * | 4/2018 |

(Continued)

OTHER PUBLICATIONS

Fielding et al., Hypertext transfer Protocol—HTTP/1.1, 2007, p. 13/88 (Year: 2007).*

(Continued)

*Primary Examiner* — William G Trost, IV
*Assistant Examiner* — Abdelbasst Talioua
(74) *Attorney, Agent, or Firm* — Leydig, Voit & Mayer, Ltd.

(57) ABSTRACT

A method for synchronizing an identity of a user between a network observer and a third party includes: reading, by the network observer, a connection request sent from the user to the third party, the connection request including a host field having a host part corresponding to the third party and a sub-host part corresponding to identification information of the user; and associating, by the network observer in a database, the identification information of the user derived from the sub-host part with the identity of the user and an identity of the third party.

14 Claims, 7 Drawing Sheets

(56) References Cited

U.S. PATENT DOCUMENTS

| | | | |
|---|---|---|---|
| 9,256,903 B2* | 2/2016 | Emura | G06Q 30/08 |
| 9,449,167 B2* | 9/2016 | Varadharajan | G06F 21/31 |
| 10,282,758 B1* | 5/2019 | Els | G06Q 30/0269 |
| 10,332,156 B2* | 6/2019 | Buchalter | G06Q 30/0241 |
| 10,460,355 B1* | 10/2019 | Demsey | G06Q 30/0277 |
| 10,554,616 B1* | 2/2020 | Teodosiu | H04L 63/168 |
| 10,559,009 B1* | 2/2020 | Kingman, Jr. | G06Q 30/0242 |
| 10,789,623 B1* | 9/2020 | Zou | G06F 7/02 |
| 10,825,064 B1* | 11/2020 | Bradley | G06Q 30/0282 |
| 11,087,365 B1* | 8/2021 | Bradley | H04L 67/53 |
| 11,276,088 B1* | 3/2022 | Saifee | G06Q 30/0275 |
| 11,308,502 B2* | 4/2022 | Metwalley | G06F 16/221 |
| 2002/0059094 A1 | 5/2002 | Hosea | H04N 21/25891 |
| | | | 725/10 |
| 2002/0062440 A1* | 5/2002 | Akama | H04L 63/12 |
| | | | 713/171 |
| 2006/0288079 A1* | 12/2006 | Deobald | G06F 21/6263 |
| | | | 709/217 |
| 2007/0185988 A1* | 8/2007 | Maring | G06Q 30/02 |
| | | | 709/224 |
| 2008/0028439 A1* | 1/2008 | Shevade | H04L 9/3236 |
| | | | 726/3 |
| 2009/0165105 A1* | 6/2009 | Chaudhry | H04L 63/166 |
| | | | 726/14 |
| 2011/0055039 A1* | 3/2011 | Paz | G06Q 30/08 |
| | | | 705/26.3 |
| 2011/0173126 A1* | 7/2011 | Knapp | G06Q 30/02 |
| | | | 705/14.71 |
| 2011/0246310 A1* | 10/2011 | Buchalter | G06Q 30/0275 |
| | | | 705/14.71 |
| 2011/0276452 A1* | 11/2011 | Stephens | G06Q 10/087 |
| | | | 705/35 |
| 2011/0289552 A1* | 11/2011 | Hatakeyama | G06F 21/62 |
| | | | 726/1 |
| 2011/0307580 A1* | 12/2011 | Fullett | H04L 67/535 |
| | | | 709/219 |
| 2012/0041816 A1* | 2/2012 | Buchalter | G06Q 30/0242 |
| | | | 705/14.71 |
| 2012/0180114 A1* | 7/2012 | Huang | H04L 61/103 |
| | | | 726/5 |
| 2012/0253928 A1* | 10/2012 | Jackson | G06Q 30/02 |
| | | | 705/14.49 |
| 2013/0031060 A1* | 1/2013 | Lowery | H04L 67/1095 |
| | | | 707/689 |
| 2013/0111220 A1* | 5/2013 | Friedlander | H04L 63/0428 |
| | | | 713/193 |
| 2013/0182840 A1* | 7/2013 | Buckley | H04L 63/0281 |
| 2013/0182841 A1* | 7/2013 | Buckley | H04L 9/0861 |
| | | | 380/44 |
| 2014/0075202 A1* | 3/2014 | Varadharajan | G06F 21/34 |
| | | | 713/183 |
| 2014/0229273 A1* | 8/2014 | Garcia-Martinez | |
| | | | G06Q 30/0275 |
| | | | 705/14.46 |
| 2014/0324603 A1* | 10/2014 | Savkar | H04N 21/812 |
| | | | 705/14.71 |
| 2016/0127440 A1* | 5/2016 | Gordon | H04L 65/601 |
| | | | 709/219 |
| 2016/0218942 A1* | 7/2016 | Choquette | H04L 43/0811 |
| 2017/0041296 A1* | 2/2017 | Ford | G06F 21/64 |
| 2017/0053307 A1* | 2/2017 | Schler | G06Q 30/0248 |
| 2017/0155641 A1* | 6/2017 | Fan | H04L 63/0807 |
| 2017/0169504 A1* | 6/2017 | Kleinberg | G06Q 30/08 |
| 2017/0195743 A1* | 7/2017 | Wood | H04N 7/17318 |
| 2017/0236165 A1* | 8/2017 | Schler | G06Q 30/0275 |
| | | | 705/14.71 |
| 2017/0257284 A1* | 9/2017 | Wood | H04L 47/323 |
| 2018/0040031 A1* | 2/2018 | Wilson | G06Q 30/0275 |
| 2018/0040060 A1* | 2/2018 | Kleinberg | G06Q 20/3829 |
| 2018/0131665 A1* | 5/2018 | Joffe | H04L 61/59 |
| 2018/0189867 A1* | 7/2018 | Hu | H04L 67/02 |
| 2018/0191695 A1* | 7/2018 | Lindemann | H04L 63/0853 |
| 2018/0218449 A1* | 8/2018 | Holmberg | G06Q 30/08 |
| 2018/0254893 A1* | 9/2018 | Saxena | H04L 9/0838 |
| 2018/0288563 A1* | 10/2018 | Krzych | H04W 4/021 |
| 2019/0005470 A1* | 1/2019 | Uhr | H04L 9/3265 |
| 2019/0068556 A1* | 2/2019 | Perlmutter | H04L 63/0281 |
| 2019/0073244 A1* | 3/2019 | Fung | G06F 11/3409 |
| 2019/0141117 A1* | 5/2019 | Ashner | H04L 67/14 |
| 2019/0149604 A1* | 5/2019 | Jahr | G06F 16/9566 |
| | | | 713/175 |
| 2019/0149856 A1* | 5/2019 | Ramaley | H04L 65/765 |
| | | | 725/34 |
| 2019/0222588 A1* | 7/2019 | Marzorati | H04L 63/1416 |
| 2019/0281587 A1* | 9/2019 | Zhang | H04W 72/10 |
| 2019/0281588 A1* | 9/2019 | Zhang | H04W 72/042 |
| 2019/0306110 A1* | 10/2019 | Davis | H04L 61/4511 |
| 2021/0090125 A1* | 3/2021 | Logvinskiy | G06Q 30/0267 |

FOREIGN PATENT DOCUMENTS

| | | | | |
|---|---|---|---|---|
| KR | 101948727 B1 * | 2/2019 | | |
| WO | WO-2008048713 A2 * | 4/2008 | | G06Q 20/0855 |
| WO | WO-2009023952 A1 * | 2/2009 | | G06Q 30/02 |

OTHER PUBLICATIONS

Panagiotis Papadopoulos, et al., "Cookie Synchronization: Everything You Always Wanted to Know But Were Afraid to Ask", arXiv:1805.10505v1, May 26, 2018, pp. 1-15.

Gonzalez, Roberto et al. "The cookie recipe: Untangling the use of cookies in the wild," 2017 Network Traffic Measurement and Analysis Conference (TMA), IFIP, Jun. 21, 2017, pp. 1-9, XP033137633.

Eastlake 3rd, D., "Transport Layer Security (TLS) Extensions: Extension Definitions," Huawei, IETF, ISOC, Jan. 18, 2011, pp. 1-25, XP015075857.

Rescorla, E. et al. "Encrypted Server Name Indication for TLS 1.3," Internet-Draft, IETF, ISOC, Jul. 3, 2018, pp. 1-19, XP015127654.

* cited by examiner

METHOD AND SYSTEM FOR SYNCHRONIZING USER IDENTITIES

FIELD

The present invention relates to a method and system for synchronizing user identities.

BACKGROUND

The Internet advertising ecosystem presented a revenue of more than $88 Billion during 2017 in the United States alone, increasing more than a 21% over 2016. A key to this success (particularly over traditional advertising) is internet advertising's ability to serve personalized advertising to the Internet users. In order to provide that personalized advertising, thousands of companies are devoted the identification and profiling of Internet users.

For example, Over The Top (OTT) providers assign identifiers to their users, usually using HTTP cookies (for fixed network users), Advertising IDs (for mobile network users), or other identifiers depending on the user's devices. On the other hand, network providers can identify different users by different means (e.g., IMSS, IP address, network ID, etc.).

To illustrate one method, take for example the use of HTTP cookies. Each companies can set an HTTP cookie into the user's device with a unique identifier that can be used by that company to track that particular user among the webpages were an associated tracker is present. For example, for User 1, Company A can set up a cookie with the ID_A, and Company B can set up a cookie with the ID_B. Then, every time User 1 visits a website where Company A is present, the cookie containing the ID_A will be sent to the respective server, allowing Company A to identify User 1. Similarly, every time User 1 visits a website where company B is present (which can be a same or different website from that which Company A is present), the cookie containing the ID_B will be sent to the respective server, Allowing Company B to identify User 1.

Recent studies have demonstrated that some of those cookie trackers are present in more than 162,000 different websites. See. e.g., Roberto Gonzalez, Lili Jiang, Mohamed Ahmed, Miriam Marciel, Ruben Cuevas, Hassan Metwalley, and Saverio Niccolini, "The cookie recipe: Untangling the use of cookies in the wild," in 2017 Network Traffic Measurement and Analysis Conference (TMA) (2017) (the entire contents of which are hereby incorporated by reference herein). Moreover, in order to increase their reach, tracking companies make agreements with web publishers in order to place tracking pixels, and the consequent cookies on their websites.

Because the success of the advertising campaigns heavily depends on the quality of the profiles generated by the trackers, tracking companies share data among themselves in order to have a comprehensive picture of users' interests. This process of data sharing is usually done by joining the profiles the tracking companies have in their databases. However, to efficiently join their databases, the tracking companies must first synchronize their respective IDs for the same user.

For example, when Company A and Company B want to join their databases for User 1, Companies A and B need to know that User 1 has the ID_A for Company A and the ID_B for Company B. Processes used to join user IDs are called Cookie Syncing or Cookie Synchronization—see. e.g., Panagiotis Papadopoulos, Nicolas Kourtellis, and Evangelos P. Markatos, "Cookie Synchronization: Everything You Always Wanted to Know But Were Afraid to Ask," arXiv: 1805.10505(2018) (the entire contents of which is hereby incorporated by reference herein)—and can be performed in different ways. However, to simplify the discussion, consider a process where when Company A is present in a website and wants to share data with Company B, it starts a redirection to Company B by adding the ID_A as a parameter. That way Company B will receive the ID_B as a cookie together with the ID_A as a parameter, thus, being able to join both profiles for User 1.

The above redirection and the parameter passing is needed because of the strict policies for HTTP cookies, which do not allow a host to allow the cookies set by another host.

Figure 1:
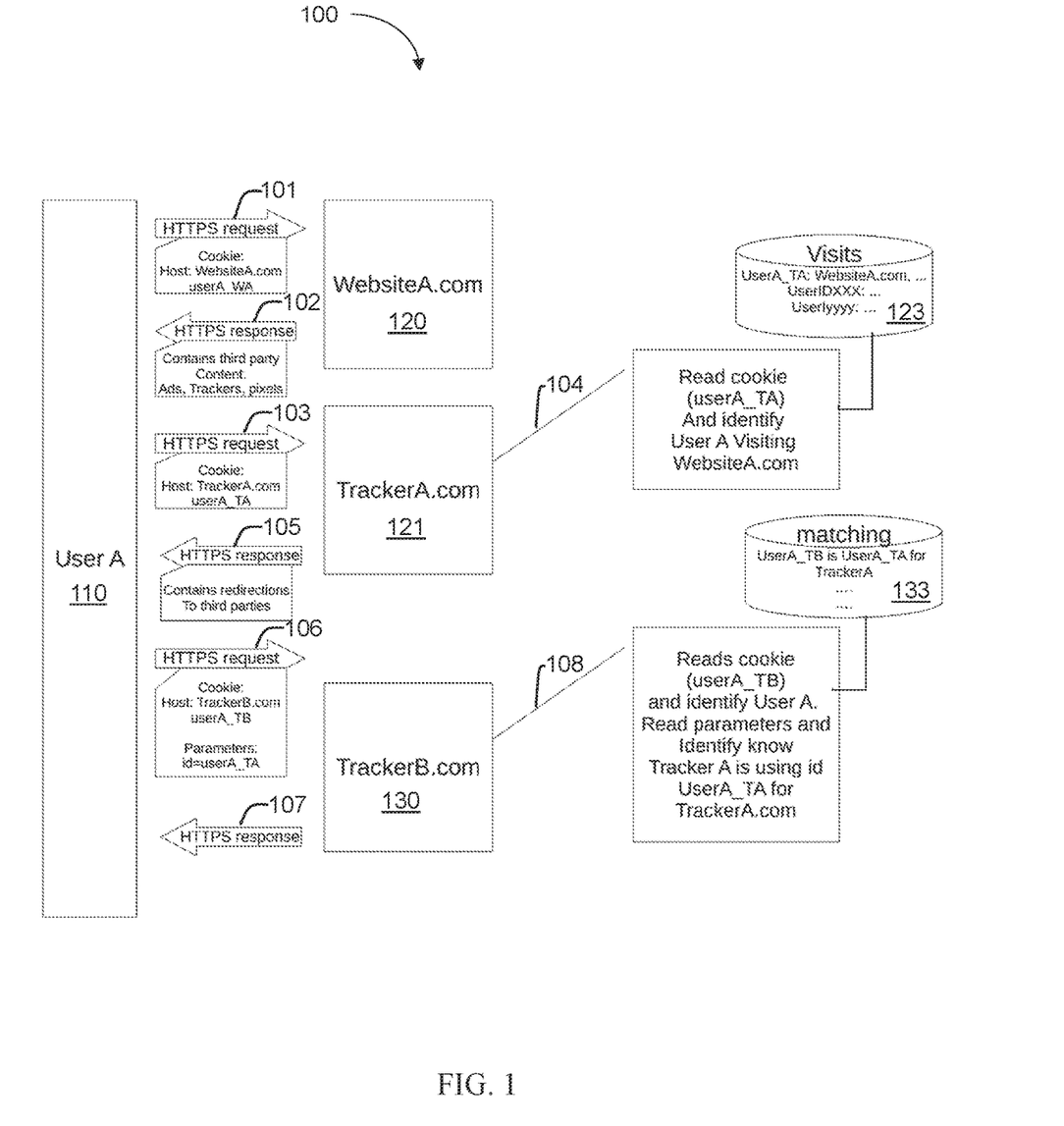
FIG. 1 illustrates a redirection and parameter passing synchronization process.

FIG. 1 shows an example redirection and parameter passing process 100. In FIG. 1, User A 110 initiates a visit to Website A 120 (e.g., WebsiteA.com) by sending an HTTPS request 101, which includes cookies of User A 110 for Website A 120, if any. The cookies can be inserted by User A's browser. The cookies can include host information (e.g., WebsiteA.com) and the respective user ID for User A 110 (e.g., userA_WA) for Website A 120.

Website A 120, in response to receiving the HTTPS request 101, sends an HTTPS response 102. The HTTPS response 102 includes the main content of Website A 120, third-party content, and may set a cookie in User A's browser. The third-party content can include advertisements, Tracker information, tracking pixels, or other information. The third-party content may be added statically or dynamically (e.g., using a script). In the example shown in FIG. 1, the third-party content includes content from Tracker A 121 (e.g., TrackerA.com).

After receiving the HTTPS response 102 with content from Tracker A 121, the browser of User A 110 sends an HTTPS request 103 to Tracker A 121 to initiate communication with Tracker A 121. In the HTTPS request 103, the browser of User A 110 attaches the cookies of User A 110 for Tracker A 121, if any. In the example of FIG. 1, the cookies of User A 110 includes the user ID—userA_TA—of User A 110 for Tracker A 121.

After receiving the cookie associated with User A 110 indicating its user ID—userA_TA, Tracker A 121 can read the cookie and identify the particular user with that particular user ID—i.e., User A 110 with user ID userA_TA—has visited Website A 120, and can add that tracking information to its database 123 (Operation 104). Tracker A's database 123 can store information on user visits, for example storing information on when a particular user (e.g., by user ID) visited a particular website (e.g., a website that Tracker A 121 is tracking). As shown in the example of FIG. 1, Tracker A's database 123 stores the cookie information that userA_TA visited WebsiteA.com.

For Tracker A 121 to share data with Tracker B 130 (e.g., TrackerB.com), it initiates a redirection and parameter passing protocol. As shown in FIG. 1, Tracker A 121 sends an HTTPS response 105—in response to the HTTPS request 103. The HTTPS response 105 includes a redirection to Tracker B 130 and User A's user ID—userA_TA—as a parameter. The redirection may specify the host of Tracker B (e.g., Host: TrackerB.com). The HTTPS response 105 can also include advertising (or other content) and may set a new cookie in User A's browser.

After receiving the HTTPS response 105, the browser of User A 110 initiates a connection to Tracker B 130 by sending HTTPS request 106 (e.g., due to the redirection indicating Tracker B from HTTPS response 105). HTTPS request 106 can include a cookie identifying User A's user ID for Tracker B—userA_TB, if any. HTTPS request 106 can also include User A's user ID for Tracker A—userA_TA—as a parameter.

Tracker B 130 reads the cookie in HTTPS request 106 and identifies User A 110 by their user ID—userA_TB. Tracker B 130 can also read the parameters in HTTPS request 106, which identifies User A 110 by its user ID—userA_TA—for Tracker A 121. Tracker B 130 now knows that the user with ID UserA_TB is the same user with ID UserA_TA for Tracker A. With this information, Tracker A 121 and Tracker B 130 may join databases. For example, Tracker B may store the matching information, matching User A 110 with its user ID—userA_TA—for Tracker A 121 and with its user ID—userA_TB—for Tracker B 130, in a matching database 133. Tracker B 130 can then share this information with Tracker A 121 (e.g., by giving Tracker A 121 access to matching database 133, transmitting the information, etc.). (Operation 108).

Tracker B 130 can send a HTTPS response 107, which can initiate further connections with other partners, and/or set cookies in the browser of User A 110.

However, a chain of redirects (such as described above in connection with FIG. 1) is not always possible because the third parties (such as trackers) are often times only able to load static content (e.g., advertising images, and/or tracking pixels) that cannot initiate redirections.

Moreover, in recent years, network operators have shown an interest in participating in the online advertising ecosystem. Network operators can present several advantages over the traditional OTT trackers. First, the network operator can identify the users without the need of cookies or other means depending on the user device. Second, contrary to the OTT providers, the network operator knows the whole browsing history of the user without the need of adding pixels or other information in the publishers websites.

However, there does not exist a straightforward way to synchronize the identity of the user for the OTT provider and for the network operator because the network operator cannot read the encrypted traffic and the OTT provider cannot use the IP address as an unique identifier because it may change, and it does not unequivocally identify a single user.

Figure 2:
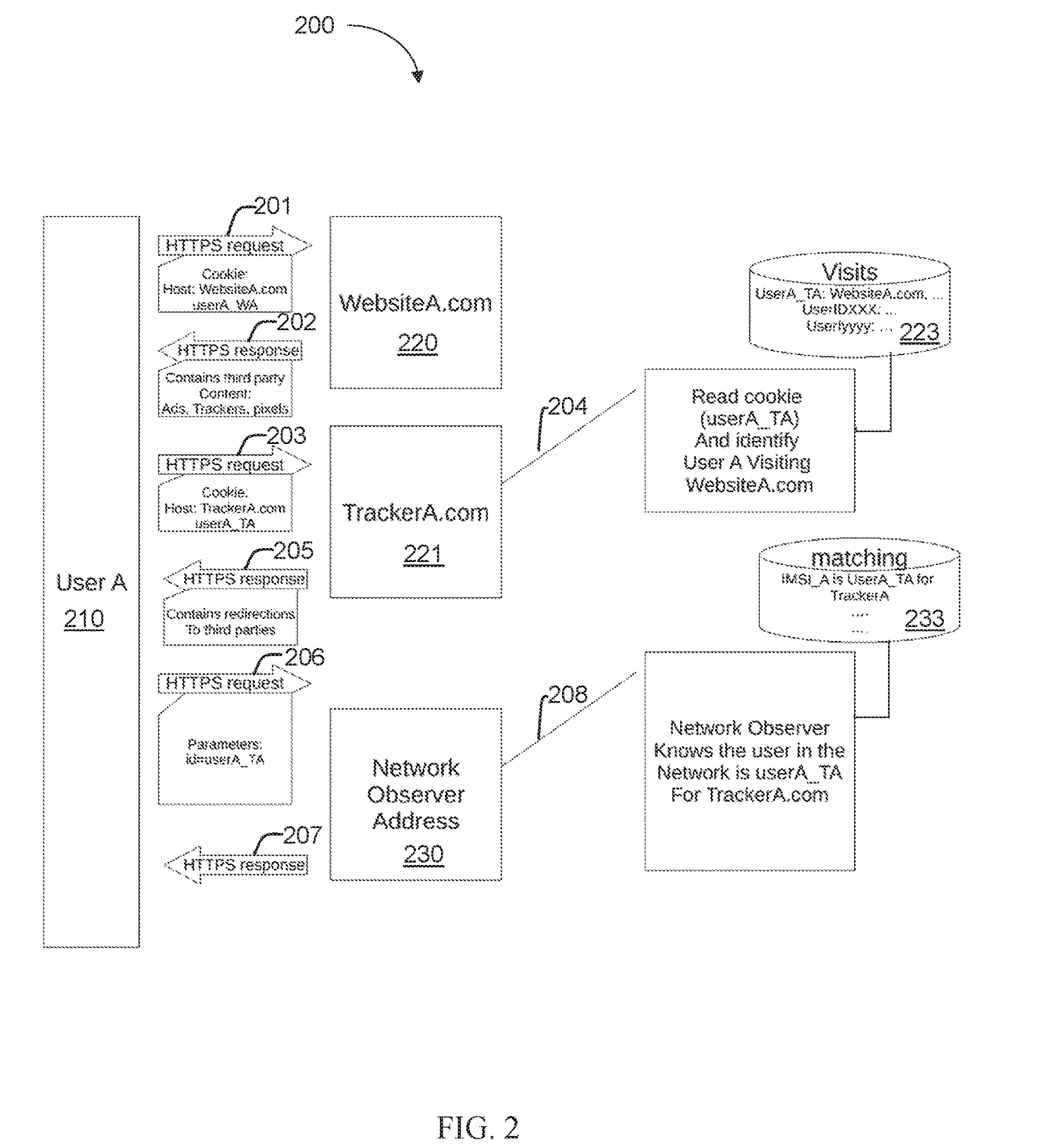
FIG. 2 illustrates another redirection and parameter passing synchronization process.

The OTT could sync with the network operator using the same redirection and parameter passing process discussed above in connection with FIG. 1, but with the network operator replacing the second tracker, such as depicted in FIG. 2.

FIG. 2 shows an example of a redirection and parameter passing process 200 between a Tracker and a network operator (shown here as a network observer). In FIG. 2, User A 210 initiates a visit to Website A 220 (e.g., WebsiteA.com) by sending an HTTPS request 201, which includes cookies of User A 210 for Website A 220, if any. The cookies can be inserted by User A's browser. The cookies can include host information (e.g., WebsiteA.com) and the respective user ID for User A 210 (e.g., userA_WA) for Website A 220.

Website A 220, in response to receiving the HTTPS request 201, sends an HTTPS response 202. The HTTPS response 202 includes the main content of Website A 220, third-party content, and may set a cookie in User A's browser. The third-party content can include advertisements, Tracker information, tracking pixels, or other information. The third-party content may be added statically or dynamically (e.g., using a script). In the example shown in FIG. 2, the third-party content includes content from Tracker A 221 (e.g., TrackerA.com).

After receiving the HTTPS response 202 with content from Tracker A 221, the browser of User A 210 sends an HTTPS request 203 to Tracker A 221 to initiate communication with Tracker A 221. In the HTTPS request 203, the browser of User A 210 attaches the cookies of User A 210 for Tracker A 221, if any. In the example of FIG. 1, the cookie includes the user ID—userA_TA—of User A 210 for Tracker A 221.

After receiving the cookie associated with User A 210 indicating its user ID—userA_TA, Tracker A 221 can read the cookie and identify the particular user with that particular user ID—i.e., User A 210 with user ID userA_TA—has visited Website A 220, and can add that tracking information to its database 223 (Operation 204). Tracker A's database 223 can store information on user visits, for example storing information on when a particular user (e.g., by user ID) visited a particular website (e.g., a website that Tracker A 221 is tracking). As shown in the example of FIG. 2, Tracker A's database 223 stores the cookie information that userA_TA visited WebsiteA.com.

For Tracker A 221 to share data with a network operator (depicted in FIG. 2 as Network Observer 230), Tracker A 221 initiates a redirection and parameter passing protocol.

As shown in FIG. 2, Tracker A 221 sends an HTTPS response 205—in response to the HTTPS request 203. The HTTPS response 205 includes a redirection to Network Observer 230 and User A's user ID—userA_TA—as a parameter. The redirection may specify the address of Network Observer 230 (e.g., Host: Network Observer Address). The HTTPS response 205 can also include advertising (or other content) and may set a new cookie in User A's browser.

After receiving the HTTPS response 205, the browser of User A 210 initiates a connection to Network Observer 230 by sending HTTPS request 206 (e.g., due to the redirection indicating Network Observer 230 from HTTPS response 205). HTTPS request 206 can include User A's user ID for Tracker A—userA_TA, as a parameter. The Network Observer 230 should already know the identity of User A 210 based on its role in the network (i.e., it should know the identity of User A 210 without the use of a cookie).

Network Observer 230 can read the parameters in HTTPS request 206, which identifies User A 210 by its user ID—userA_TA—for Tracker A 221. Network Observer 230 now knows that the user with ID UserA_TA is the same user as User A 210 within its network. With this information, Tracker A 221 and Network Observer 230 may join databases. For example, Network Observer 230 may store the matching information, matching User A 210 with its user ID—userA_TA—for Tracker A 221 in a matching database 233. Network Observer 230 can then share this information with Tracker A 221 (e.g., by giving Tracker A 221 access to matching database 233 or otherwise). (Operation 208).

Network Observer 230 can send a HTTPS response 207, which can initiate further connections with other partners, and/or send other content (such as advertising) to User A 210.

Nevertheless, the above redirection and parameter passing process is possible only when Tracker A 210 has the ability to initiate a redirection. Thus, it cannot be done by companies serving tracking pixels or commercials. This is important because many of the data management platforms (DMPs) and tracking (or tagging) companies only have these possibilities. Furthermore, it would require the synchronization between the vantage point used to observe the network and the server used to receive the IDs for other partners.

SUMMARY

According to an embodiment of the present invention, a method is provided for synchronizing an identity of a user between a network observer and a third party that includes: reading, by the network observer, a connection request sent from the user to the third party, the connection request including a host field having a host part corresponding to the third party and a sub-host part corresponding to identification information of the user; and associating, by the network observer in a database, the identification information of the user derived from the sub-host part with the identity of the user and an identity of the third party.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide a method and system to synchronize the identities assigned to users for both an OTT provider and a network observer (e.g., the network provider) to allow the sharing of information among them.

In order to overcome the aforementioned limitations of state of the art systems, embodiments of the present invention modify the use of the Host field of HTTP(s) to add a user identifier. To make embodiments compatible with current Internet protocols, the modification is done by adding a prefix subdomain at the beginning of the communication. That way, according to embodiments of the present invention, when Company A initiates a communication with their server subdomain.companyA.com it will instead initiate the communication with userID.subdomain.companyA.com.

The added subdomain can be read by the network operator because the server name indication (SNI) field of transport layer security (TLS) includes the subdomain in plain text. Moreover, the added subdomain does not affect the DNS routing, and the OTT provider can read the added subdomain upon arrival, and together with the cookies, can relate the user information.

Embodiments of the present invention provide a system that modifies the non-encrypted SNI field of TLS to transmit information (e.g., user ID information) in a way that is compatible with state of the art routing and internet protocols. An advantage of embodiments is that they enable synchronization of the identity of a user between an OTT provider and a network observer. Indeed, embodiments of the present invention allow for the synchronization of user IDs between an OTT provider and a network observer without the need to establish any explicit communication between the OTT provider and the network observer.

A method, according to an embodiment of the present invention, includes one or more of the following sub-systems/operations: (1) a final user having a sub-system A configured to initiate a connection to a third party (e.g., a tracker) from a browser of the user after the user visits a website; (2) the sub-system A is further configured to add information about the final user (e.g., an encrypted/unencrypted user ID or a random ID) in a host field of a HTTP/HTTPS request as a sub-host of a final host to which the user is attempting to connect; (3) a sub-system B associated with the third party (e.g., the tracker) that is configured to relate the information in the sub-host with its user database; (4) a sub-system C in a network observer, which is configured to see traffic of the final user, to read the information in the sub-host field, and to assign the information to its own user database; and/or (4) the sub-system B of the third-party and the sub-system C of the network observer are configured to communicate and share information about the final user using as the user ID the information shared in the sub-host field.

According to an embodiment of the present invention, a method is provided for synchronizing an identity of a user between a network observer and a third party that includes: reading, by the network observer, a connection request sent from the user to the third party, the connection request including a host field having a host part corresponding to the third party and a sub-host part corresponding to identification information of the user; and associating, by the network observer in a database, the identification information of the user derived from the sub-host part with the identity of the user and an identity of the third party.

In an embodiment, the host field can be in a server name indication (SNI) field of transport layer security (TLS), and the connection request can be a HTTP request or an HTTPS request.

A user ID of the user for use with the third party can be provided as plain text in the sub-host part of the host field.

The sub-host part can include encrypted text corresponding to a user ID of the user for use with the third party. Further, the method may include decrypting, by the network observer, the sub-host part to determine the user ID prior to performing the associating. The encrypted text can include an encryption of the user ID and a cryptographic nonce. The encrypted text can include encrypted information other than that indicating the user ID or a cryptographic nonce. The encrypted information may include bids for real time bidding.

In an embodiment, the sub-host part includes a random number as the identification information of the user.

In an embodiment, the network observer is a network provider.

In an embodiment, the third party is an over the top (OTT) provider.

The method of an embodiment may further include sharing, by the network observer with the third party, information about the association between the identification information of the user derived from the sub-host part with the identity of the user.

According to another embodiment of the present invention, a network observer is provided that includes a processor and a memory. The memory includes processor executable instructions that, when executed by the processor, cause the processor to perform the following operations for synchronizing an identity of a user between the network observer and a third party: reading, by the network observer, a connection request sent from the user to the third party, the connection request including a host field having a host part corresponding to the third party and a sub-host part corresponding to identification information of the user; and associating, by the network observer in a database, the identification information of the user derived from the sub-host part with the identity of the user and an identity of the third party.

According to another embodiment, a method is provided for synchronizing an identity of a user between a network observer and a third party. The method includes: sending, by the user, a website connection request to a website; receiving, by the user from the website, a website connection response including content of the website and content corresponding to the third party; and sending, by the user over a network having the network observer, a third party connection request to connect to the third party, the connection request including a host field having a host part corresponding to the third party and a sub-host part corresponding to identification information of the user.

The sub-host part may include plain text indicating a user ID of the user for use with the third party, encrypted text corresponding to the user ID, or a random number.

Figure 3:
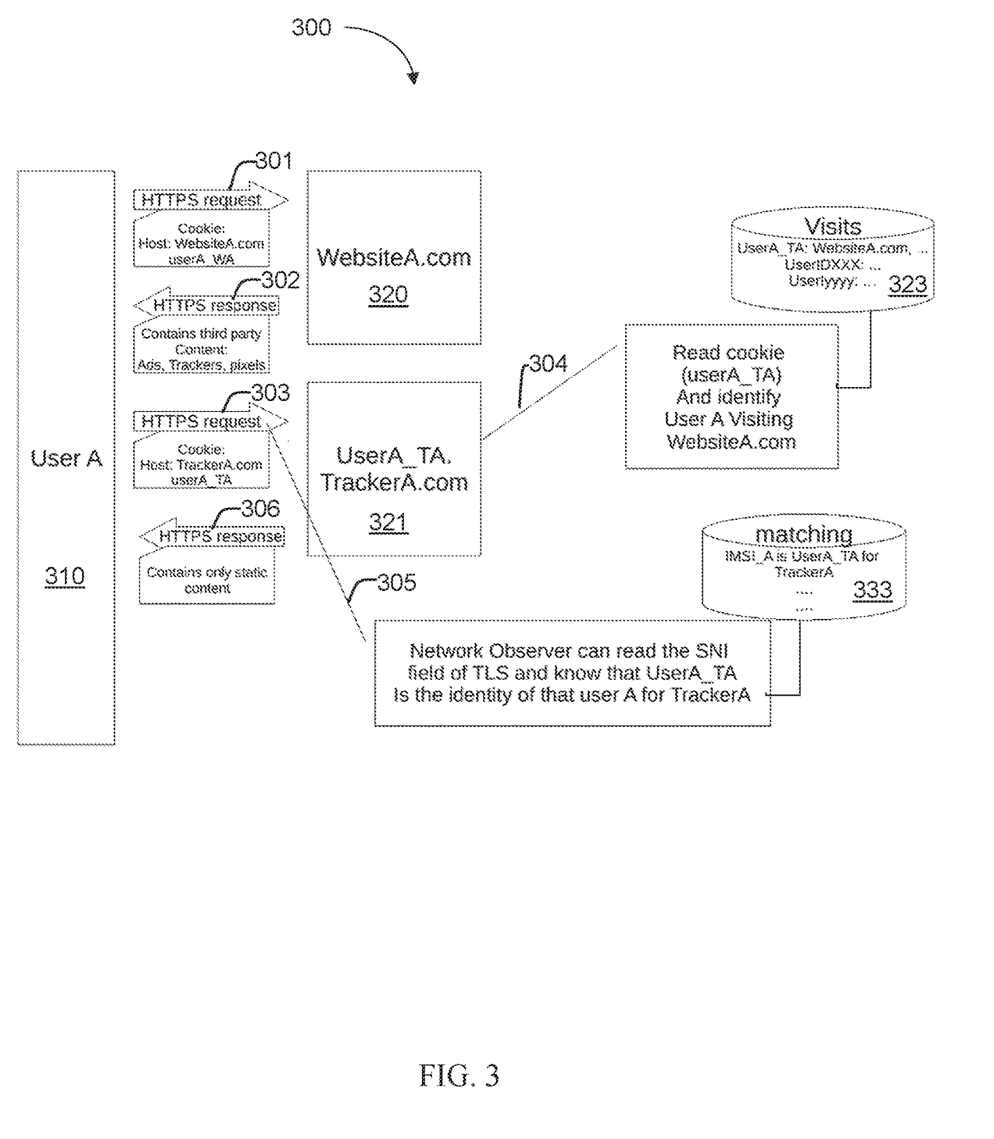
FIG. 3 illustrates a synchronization system according to an embodiment of the present invention.

FIG. 3 depicts a user identity synchronization system 300 according to an embodiment of the present invention.

User A 310 initiates a visit to Website A 320 (e.g., WebsiteA.com) by sending a HTTPS request 301, which includes cookies of User A 310 for Website A 320, if any. The cookies can be inserted by User A's browser. The cookies can include host information (e.g., WebsiteA.com) and the respective user ID for User A 310 (e.g., userA_WA) for Website A 320.

Website A 320, in response to receiving the HTTPS request 301, sends an HTTPS response 302. The HTTPS response 302 includes the main content of Website A 320, third-party content, and may set a cookie in User A's browser. The third-party content can include advertisements, tracker information, tracking pixels, or other information. The third-party content may be added statically or dynamically (e.g., using a script). In the example shown in FIG. 3, the third-party content includes content from Tracker A 321 (e.g., TrackerA.com).

After receiving the HTTPS response 302 including content from Tracker A 321, the browser of User A 310 initiates communication with Tracker A 321 by sending HTTPS request 303 to Tracker A 321. In FIG. 3, Tracker A 321 is at the domain TrackerA.com. In accordance with embodiments of the present invention, the host parameter in the HTTPS request 303 includes a prefix subdomain (sub-host field or sub-host part of the host field) indicating the identity of the user. In the example shown in FIG. 3, this means that the HTTPS request 303 is initiated to UserA_TA.TrackerA.com. Here, UserA_TA is a subdomain prefix to the domain TrackerA.com, and the subdomain prefix UserA_TA indicating the user ID for User A 310 for Tracker A 321. This is different from the state of the art process, where no such user-identifying subdomain prefix is used.

The HTTPS request 303 can also include a cookie, which can include host information (e.g., Host: TrackerA.com) and user ID information (e.g., userA_TA). Tracker A 321 can read the cookie and identify the particular user with that particular user ID—i.e., User A 310 with user ID userA_TA—has visited Website A 320, and can add that tracking information to its database 323 (Operation 304). Tracker A's database 323 can store information on user visits, for example storing information on when a particular user (e.g., by user ID) visited a particular website (e.g., a website that Tracker A 321 is tracking). As shown in the embodiment of FIG. 3, Tracker A's database 323 stores the cookie information that userA_TA visited WebsiteA.com.

A network observer can read the SNI field of TLS of the HTTPS request 303 and know that Tracker A 321 uses UserA_TA to identify the network user User A 310 (e.g., by parsing the sub-domain). This way, the network observer can easily relate the rest of the traffic for that user with its identifier and will be able to share meaningful information with the OTT provider. (Operation 305).

For example, with this information, Tracker A 321 and the network observer may join databases. For example, the network observer may store the matching information, matching User A 310 with its user ID—userA_TA—for Tracker A 321 in a matching database 333. The network observer can then share this information with Tracker A 321 (e.g., by giving Tracker A 321 access to matching database 333).

As shown in FIG. 3, Tracker A 321 can also send an HTTPS response 306—in response to the HTTPS request 303. The HTTPS response 306 may include advertising (or other content) and may set a new cookie in User A's browser. In an embodiment, the HTTPS 360 may include only static content In the embodiment of the present version of the invention discussed in connection with FIG. 3, other network observers could know the user ID of User A 310 for Tracker A 321 (e.g., network observers not of the network provider). This may result in undesirably showing information to other possible observers of the network (e.g., anybody in a public WiFi network with User A 310). This could present certain privacy implications, and could limit the benefits of using HTTPS because an identity of the users would be discoverable in plain text.

To this end, embodiments of the present invention provide transmission of information in the SNI field that is secure. For example, in order to overcome the above-described privacy concerns, user information can be sent in an encrypted way, which is not accessible to all observers of the network.

Figure 4:
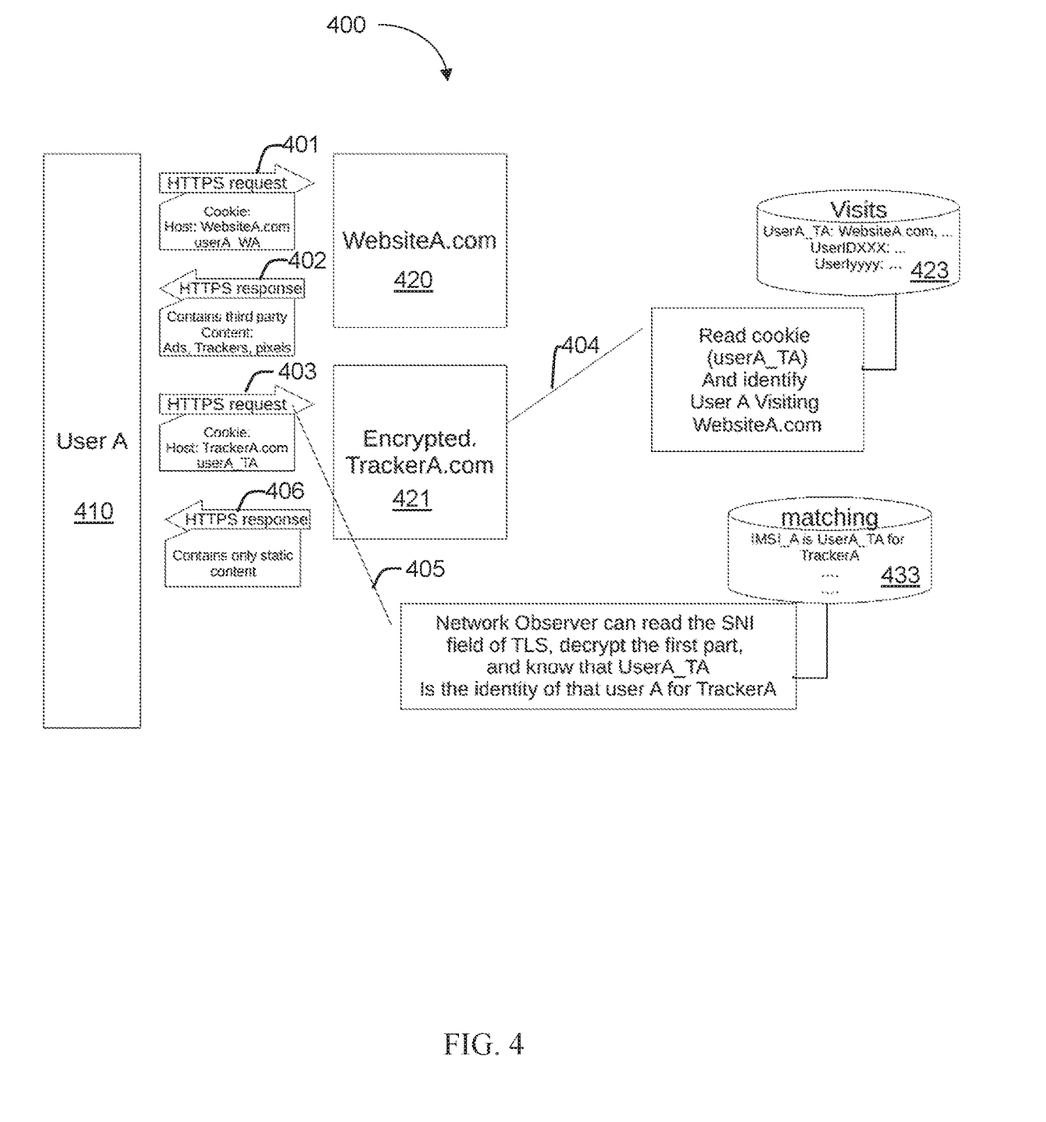
FIG. 4 illustrates a synchronization system using encryption according to an embodiment of the present invention.

FIG. 4 illustrates and embodiment of the present invention having an encrypted User ID synchronization system 400. In the embodiment of FIG. 4, the subdomain prefix included in the communication to a tracker includes an encrypted representation of the user's ID.

In FIG. 4, User A 410 initiates a visit to Website A 420 (e.g., WebsiteA.com) by sending an HTTPS request 401, which includes cookies of User A 410 for Website A 420, if any. The cookies can be inserted by User A's browser. The cookies can include host information (e.g., WebsiteA.com) and the respective user ID for User A 410 (e.g., userA_WA) for Website A 420.

Website A 420, in response to receiving the HTTPS request 401, sends an HTTPS response 402. The HTTPS response 402 includes the main content of Website A 420, third-party content, and may set a cookie in User A's browser. The third-party content can include advertisements, tracker information, tracking pixels, or other information. The third-party content may be added statically or dynamically (e.g., using a script). In the example shown in FIG. 4, the third-party content includes content from Tracker A 421 (e.g., TrackerA.com).

After receiving the HTTPS response 402 including content from Tracker A 421, the browser of User A 410 initiates communication with Tracker A 421 by sending HTTPS request 403 to Tracker A 421. In FIG. 4, Tracker A 421 is at the domain TrackerA.com. In accordance with embodiments of the present invention, the host parameter in HTTPS request 303 includes a prefix subdomain indicating the identity of the User.

In the embodiment shown in FIG. 4, instead of directly adding the user ID as the subdomain (as was done in the embodiment of FIG. 3), the subdomain prefix added is "Encrypted" such that a connection could be initiated to Encrypted.TrackerA.com. In this embodiment, "Encrypted" is encrypted text including the user ID (UserA_TA) and, at least, a cryptographic nonce. Moreover, this encrypted text could be used to transfer other information, such as possible bids for a Real Time Bidding mechanism.

In an embodiment, to perform this encryption, all entities intended to have access to the encrypted communication can use different symmetric or public key mechanisms (such as AES or RSA). Accordingly, only entities that should have access to the user ID can decrypt and read the user ID, while others (such as other network observers) cannot read the user ID.

The HTTPS request 403 can also include a cookie, which can include host information (e.g., Host: TrackerA.com) and user ID information (e.g., userA_TA). Tracker A 421 can read the cookie and identify the particular user with that particular user ID—i.e., User A 410 with user ID userA_TA—has visited Website A 420, and can add that tracking information to its database 423 (Operation 404). Tracker A's database 423 can store information on user visits, for example storing information on when a particular user (e.g., by user ID) visited a particular website (e.g., a website that Tracker A 421 is tracking). As shown in the embodiment of FIG. 4, Tracker A's database 423 stores the cookie information that userA_TA visited WebsiteA.com.

The network observer can read the SNI field of TLS of the HTTPS request 403, decrypt the first part (e.g., the "Encrypted" subdomain), and know that Tracker A 421 uses UserA_TA to identify the network user User A 410. (Operation 405). This way, the network observer can easily relate the rest of the traffic for that user with its identifier and will be able to share meaningful information with the OTT provider.

For example, with this information, Tracker A 421 and the network observer may join databases. For example, the network observer may store the matching information, matching User A 410 with its user ID—userA_TA—for Tracker A 421 in a matching database 433. The network observer can then share this information with Tracker A 421 (e.g., by giving Tracker A 421 access to matching database 433).

As shown in FIG. 4, Tracker A 421 can also send an HTTPS response 406—in response to the HTTPS request 403. The HTTPS response 406 may include advertising (or other content) and may set a new cookie in User A's browser, which may be only static content Embodiments of the present invention provide for synchronization of the user ID when the user identity is not known a priori. For example, there may exist case in which the identity of a user is not known when the connection to a tracker is initiated (e.g., when sending HTTPS request 403 in FIG. 4). This may happen the first time a user visits a website, which is before a user ID has been assigned. This synchronization may also be useful for the case in which a website (e.g., Website A 420) does not have the ability to initiate a connection with a tracker (e.g., Tracker A 421) that is specific to a user (e.g., User A 410). This may happen if the connection is initiated by a general script that is not specifically personalized, which is the case for a many links in advertising ecosystems.

Figure 5:
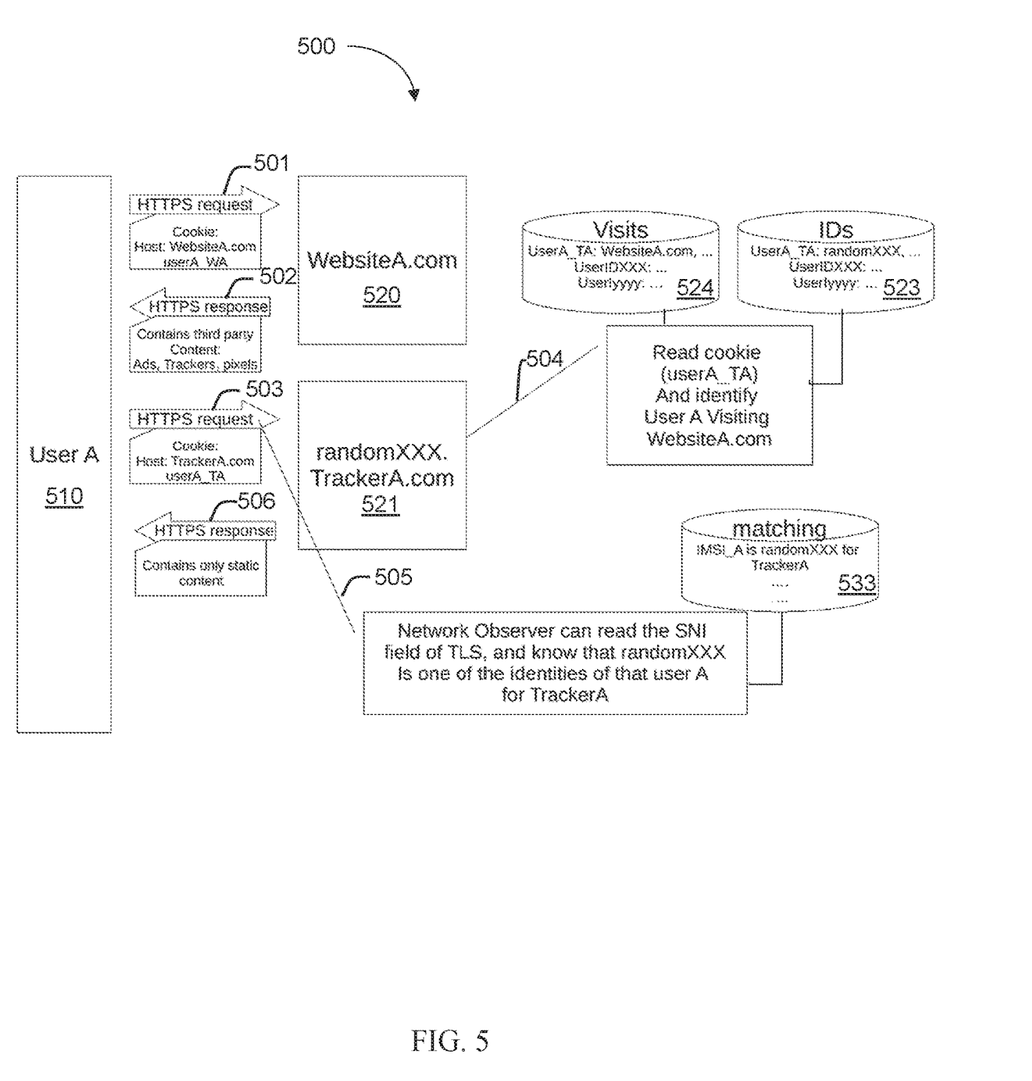
FIG. 5 illustrates a synchronization system using random numbers according to an embodiment of the present invention.

FIG. 5 depicts a system 400 according to an embodiment of the present invention that is able synchronize a user ID without disclosing any personal information, and without previous knowledge of the user. In the synchronization system 400, when initiating communication to a tracker, the HTTP(S) request from the user includes a random number in the subdomain prefix. The random number may be generated every time a communication is added.

User A 510 initiates a visit to Website A 520 (e.g., WebsiteA.com) by sending an HTTPS request 501, which includes cookies of User A 510 for Website A 520, if any. The cookies can be inserted by User A's browser. The cookies can include host information (e.g., WebsiteA.com) and the respective user ID for User A 310 (e.g., userA_WA) for Website A 320.

Website A 520, in response to receiving the HTTPS request 501, sends an HTTPS response 502. The HTTPS response 502 includes the main content of Website A 520, third-party content, and may set a cookie in User A's browser. The third-party content can include advertisements, tracker information, tracking pixels, or other information. The third-party content may be added statically or dynamically (e.g., using a script). In the example shown in FIG. 5, the third-party content includes content from Tracker A 521 (e.g., TrackerA.com).

After receiving the HTTPS response 502 including content from Tracker A 521, the browser of User A 510 initiates communication with Tracker A 521 by sending HTTPS request 503 to Tracker A 321. In FIG. 5, Tracker A 521 is at the domain TrackerA.com. In accordance with embodiments of the present invention, the host parameter in HTTPS request 503 includes a prefix subdomain.

In the synchronization system 500 of the FIG. 5, the communication to Tracker A 521 is initiated to randomXXX.TrackerA.com, that is the prefix subdomain is "randomXXX". In the present embodiment, "randomXXX" is a random number that is generated every time a communication is added (as such, it is different each time). For example, when User A 510 communicates with a tracker for the first time, it will create a new random number and use that random number as a subdomain prefix in its initial communication to the tracker.

The HTTPS request 504 can also include a cookie identifying a user ID userA_TA.

Upon receiving the HTTPS request 503, Tracker A 521 parses the subdomain to obtain the random number "randomXXX" and reads the cookie to identify userA_TA. Upon receipt of this information, Tracker A 521 now knows that the randomXXX number just generated has been sent by a user associated with the user ID userA_TA. Operation 504.

Tracker A 521 saves the association of random number and user IDs in an ID database 523. Tracker A 521 can also save in a database 524 website visits, such as that a user with user ID userA_TA has visited Website A 320.

A network observer can read the SNI field of TLS of the HTTPS request 503 and know that randomXXX is one of the identities of network user User A 510 (e.g., by parsing the subdomain), which is used for Tracker A 533. This way the network observer can easily relate traffic for that user with its identifier and will be able to share meaningful information with the OTT provider. (Operation 505).

For example, with this information, Tracker A 521 and the network observer may join databases. For example, the network observer may store the matching information, matching User A 510 with its user ID—randomXXX—for Tracker A 521 in a matching database 533. The network observer can then share this information with Tracker A 521 (e.g., by giving Tracker A 521 access to matching database 533).

As such all relevant entities (e.g., Tracker A and the network observer) may keep a (joint or separate) database of random numbers corresponding to a given user (for example in an embodiment where every communication will have a new random number), which can be synchronized to join different identities for the same user.

Figure 6:
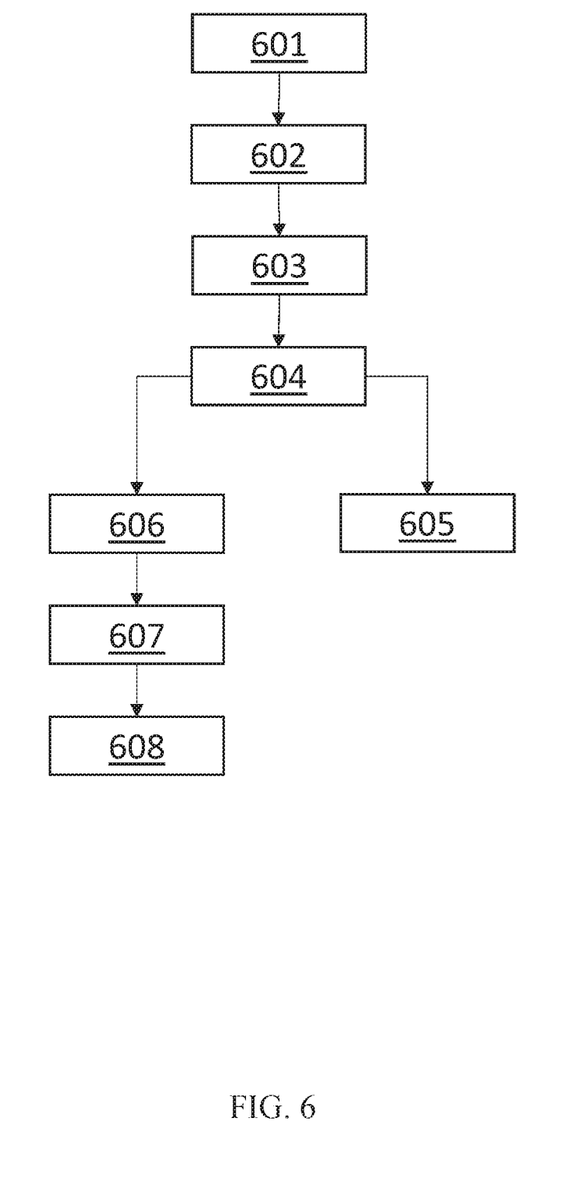
FIG. 6 illustrates a method for synchronizing user identification information according to and embodiment of the present invention.

FIG. 6 is a block diagram illustrating a method of synchronizing an identity of a user between a network observer and a third party according to an embodiment of the present invention.

In the synchronization method 600 shown in FIG. 6, a user sends a website connection request to a website (Operation 601). In response, the user subsequently receives a website connection response from the website (Operation 602). The website connection response can include content of the website, one or more cookies, and content corresponding to a third party (e.g., an over the top (OTT) provider, such as a tracker).

After receiving the website connection response, the user initiates a connection to the third party from its browser. To initiate this connection, the user creates a third party connection request. The third party connection request has a host field, that has a host part indicating the third party (e.g., a host domain of the third party) and a sub-host part corresponding to information of the user. When creating the sub-host part, the user may include in the sub-host part plain text indicating a user ID of the user for use with the third party, encrypted text corresponding to the user ID, or a random number. If incorporating the random number, the user may create a new random number for each new connection to a third party. (Operation 603).

A sub-system (sub-system A) configured to perform Operation 603 may be included at the user (e.g., at a user's computer) in an embodiment.

After creating the third party connection request, the user sends the third party connection request to the third party via a network having a network observer (Operation 604). The connection request may be sent as an HTTP request or an HTTPS request, and the host field may be is in a server name indication (SNI) field of transport layer security (TLS). The connection request can also include a cookie indicating a user ID of the user at the third party website.

After receiving the third party connection request from the user, the third party parses the request, and relates the received information about the user's identity (and other tracking information, if any) in a database (Operation 605). A sub-system (sub-system B) configured to execute Operation 605 may be included at the third party (e.g., at a server of the third party).

The network observer reads the connection request sent from the user to the third party. The network observer can interpret the host field to determine identification information of the user. (Operation 606).

For example, if the host field includes a plain text in the sub-host part, the network observer can interpret that text to include a user ID associated with the user and used at the third party. As another example, if the host field includes encrypted text in the sub-host part, the network observer can decrypt the encrypted text to determine the user ID (other information, such as bidding information may also be included in the encrypted text).

The network observer may be a network operator operating a network that the user communicates over; and is thus capable of seeing network traffic of the user, including the third party connection request.

The network observer then associates the identification information of the user derived from the sub-host part with the identity of the user and an identity of the third party (Operation 607). The network observer can save this information in a database.

The network observer may communicate with the third party to share information about the user, including the user association information stored in its database (Operation 608).

A sub-system (sub-system C) configured to perform Operations 606, 607, and 608 may be included at the network observer (e.g., at a server of the network provider) in an embodiment.

Figure 7:
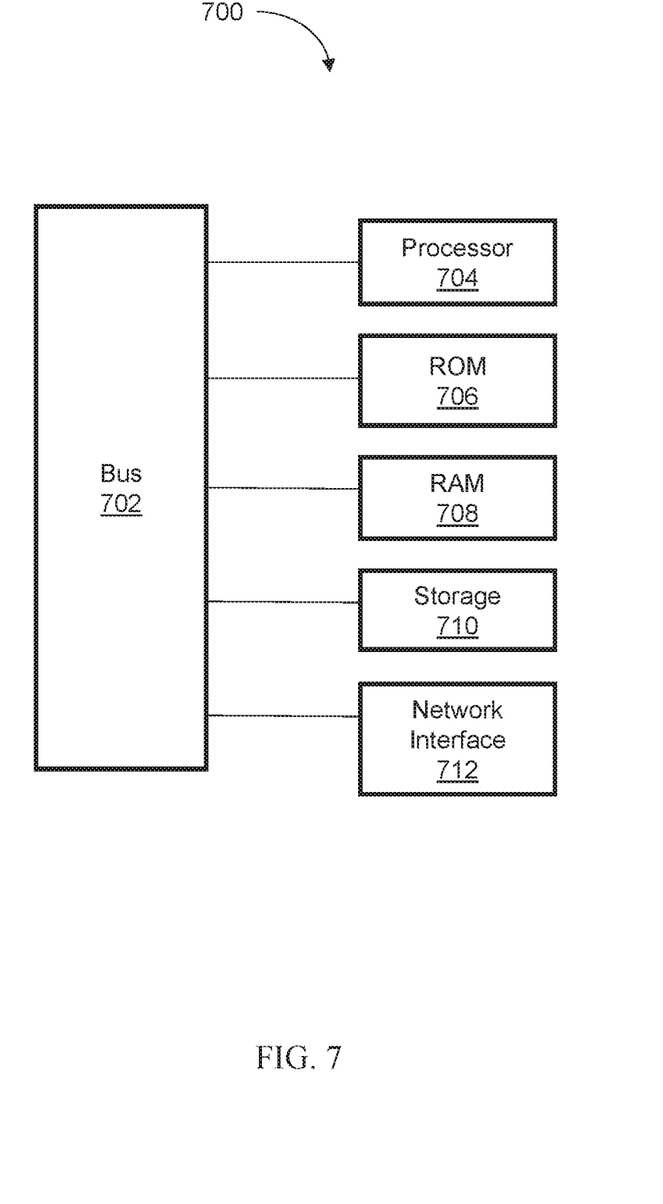
FIG. 7 illustrates a processing system according to an embodiment of the present invention.

FIG. 7 is a block diagram of a processing system according to an embodiment. The processing system 700 can be used to implement the protocols, devices, mechanism, systems and methods described above. The processing system 700 includes a processor 704, such as a central processing unit (CPU) of a computing device or a distributed processor system. The processor 704 executes processor executable instructions comprising embodiments of the system for performing the functions and methods described above. In embodiments, the processor executable instructions are locally stored or remotely stored and accessed from a non-transitory computer readable medium, such as storage 710, which may be a hard drive, cloud storage, flash drive, etc. Read Only Memory (ROM) 706 includes processor executable instructions for initializing the processor 704, while the random-access memory (RAM) 708 is the main memory for loading and processing instructions executed by the processor 704. The network interface 712 may connect to a wired network or cellular network and to a local area network or wide area network, such as the Internet.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for synchronizing an identity of a user between a network observer and a third party, the method comprising:
    reading, by the network observer, a connection request sent from the user to the third party, the connection request including a host field, the host field comprising:
        a host part corresponding to the third party; and
        a sub-host part corresponding to identification information of the user; and
    associating, by the network observer in a database, the identification information of the user derived from the sub-host part with the identity of the user and an identity of the third party,
    wherein the sub-host part further comprises encrypted text comprising encrypted information comprising bids for real time bidding, and
    wherein the connection request comprises a uniform resource identifier using a hypertext transfer protocol (HTTP) scheme specific syntax and semantics, the host field being predefined within the HTTP scheme specific syntax and semantics.

2. The method according to claim 1, wherein the host field is in a server name indication (SNI) field of transport layer security (TLS), and the connection request is a HTTP request or an HTTPS request.

3. The method according to claim 1, wherein a user ID of the user for use with the third party is provided as plain text in the sub-host part of the host field.

4. The method according to claim 1, wherein the encrypted text in the sub-host part includes encrypted text corresponding to a user ID of the user for use with the third party.

5. The method according to claim 4, the method further comprising decrypting, by the network observer, the sub-host part to determine the user ID prior to performing the associating.

6. The method according to claim 4, wherein the encrypted text includes an encryption of the user ID and a cryptographic nonce.

7. The method according to claim 1, wherein the sub-host part includes a random number as the identification information of the user.

8. The method of claim 1, wherein the network observer is a network provider.

9. The method of claim 1, wherein the third party is an over the top (OTT) provider.

10. The method of claim 1 further comprising sharing, by the network observer with the third party, information about the association between the identification information of the user derived from the sub-host part with the identity of the user.

11. A network observer comprising a processor and a memory, the memory comprising processor executable instructions that, when executed by the processor, cause the processor to perform the following operations for synchronizing an identity of a user between the network observer and a third party:
    reading, by the network observer, a connection request sent from the user to the third party, the connection request including a host field, the host field comprising:
        a host part corresponding to the third party; and
        a sub-host part corresponding to identification information of the user; and
    associating, by the network observer in a database, the identification information of the user derived from the sub-host part with the identity of the user and an identity of the third party
    wherein the sub-host part further comprises encrypted text comprising encrypted information comprising bids for real time bidding, and
    wherein the connection request comprises a uniform resource identifier using a hypertext transfer protocol (HTTP) scheme specific syntax and semantics, the host field being predefined within the HTTP scheme specific syntax and semantics.

12. A method for synchronizing an identity of a user between a network observer and a third party, the method comprising:
    sending, by the user, a website connection request to a website;
    receiving, by the user from the website, a website connection response including content of the website and content corresponding to the third party; and
    sending, by the user over a network having the network observer, a third party connection request to connect to the third party, the connection request including a host field,. the host field comprising:
        a host part corresponding to the third party; and
        a sub-host part corresponding to identification information of the user,
    wherein the sub-host part further comprises encrypted text comprising encrypted information comprising bids for real time bidding, and
    wherein the connection request comprises a uniform resource identifier using a hypertext transfer protocol (HTTP) scheme specific syntax and semantics, the host field being predefined within the HTTP scheme specific syntax and semantics.

13. The method according to claim 12, wherein the sub-host part comprises plain text indicating a user ID of the user for use with the third party, and the encrypted text in the sub-host part comprises encrypted text corresponding to the user ID, or a random number.

14. The method according to claim 1, wherein the HTTP scheme specific syntax and semantics for the uniform resource identifier is defined as comprising:
    "http:"//" host_field [":" port ] [abs_path ["?" query ]], wherein the host field further has a syntax and semantics defined as comprising:
    sub-host_part.host_part.

* * * * *